Sept. 9, 1947.    J. I. LONDON    2,427,011
RADIAL CUTTER
Filed July 13, 1945
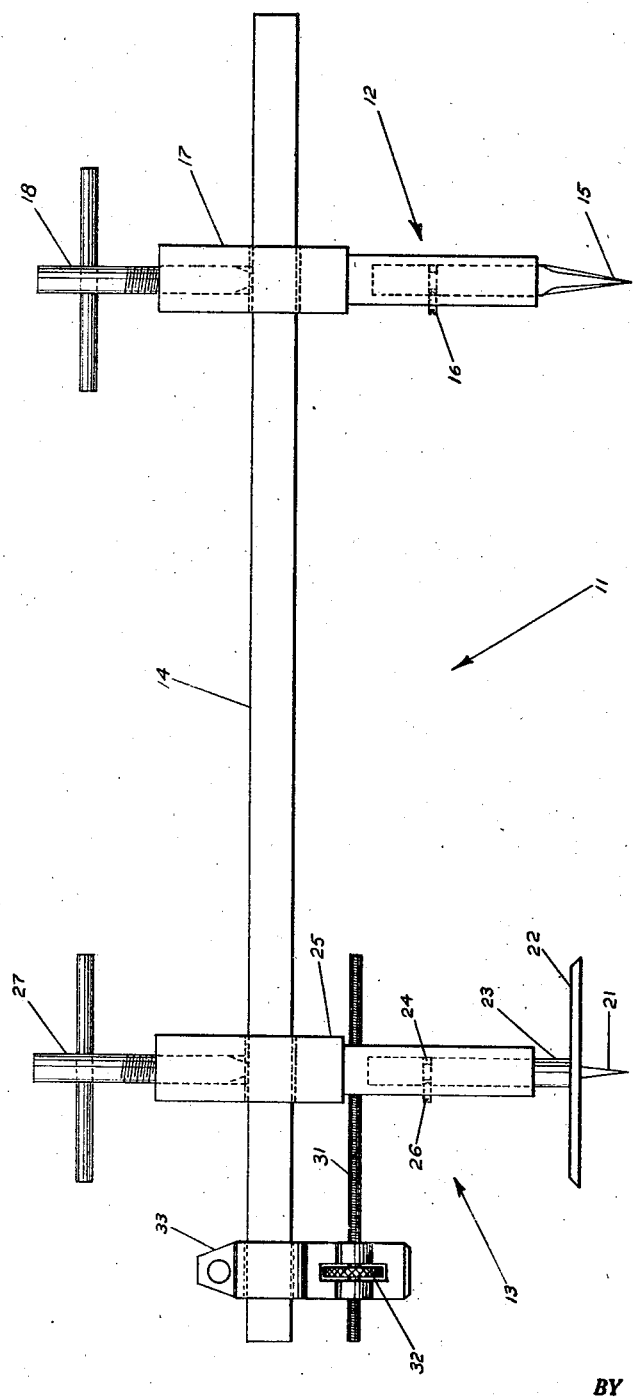
INVENTOR.
Jack I. London
BY
Ralph Chappell
ATTORNEY Patented Sept. 9, 1947

2,427,011

UNITED STATES PATENT OFFICE 2,427,011

RADIAL CUTTER

Jack I. London, New York, N. Y.

Application July 13, 1945, Serial No. 604,950

3 Claims. (Cl. 164—71)

(Granted under the act of March 3, 1883, as amended April 30, 1928; 370 O. G. 757)

This invention relates in general to an article of manufacture and in particular to a radial cutter for thin sheet materials.

It is frequently necessary to cut thin sheet materials such as, for example, cloth, paper, and the like for use as patterns and for other similar purposes; in machine shop practice for instance, it is common to cut a paper pattern or template in accordance with blueprint specifications. When a smooth arc or circle is called for, the operator commonly has used make-shift equipment, namely a gasket cutter or other equipment which happens to be readily available. This frequently results in a torn or otherwise ruined pattern, which in the case of a rather complicated design often causes the waste of considerable time.

It is an object of this invention to provide a new radial cutter for thin sheet materials.

It is an additional object to provide a template cutter having a sharp cutting edge adapted to be rotated around a protected pivot at an accurately adjustable radius.

Further objects and advantages of this invention, as well as its construction, arrangement and operation, will be apparent from the following description and claims in connection with the accompanying drawings, in which, the figure is a side elevation of one embodiment of this invention.

There is shown a radial cutter generally designated 11 comprising a cutting assembly generally designated 12 and a support assembly generally designated 13 mounted on a square or angular bar 14.

The cutting assembly 12 comprises a razor sharp cutting tool 15 replaceably mounted by means of set screw 16 in a holder or frame 17. This frame 17 is snugly and slidably mounted on bar 14 and is provided with a screw clamp 18 adapted to be tightened, thereby retaining the cutting assembly 12 in a rigid but adjustable position on the bar 14.

The support assembly 13 comprises a needle sharp member 21 projecting slightly beyond a comparatively wide flat disc 22. Projecting from the other side of this disc 22 is a shaft 23 having near its other end a narrow portion or neck 24. This shaft 23 is rotatably mounted within the frame member 25 and is replaceably secured in position by means of set screw 26 screwed into the frame 25 and projecting into the neck portion 24 of the shaft. The frame member 25 is snugly and slidably mounted on bar 14 and is provided with a screw clamp 27 adapted to retain it firmly in its position.

Coacting with frame member 25 there is provided an adjustment screw 31 operated by means of knurled wheel 32 which is mounted in frame member 33, which in turn is mounted in a fixed position on bar 14.

In the use and operation of this cutter screw clamp 18 is loosened and cutting assembly 12 is slid along bar 14 so that the distance between cutting edge 15 and needle point 21 is approximately the desired radius of the arc or circle to be cut. Screw clamp 18 is then tightened fastening the cutting assembly in position and screw clamp 27 is loosened. An accurate setting of the desired radius is obtained by turning wheel 32 thereby operating the adjustment screw 31. When the radius has been accurately set, the support assembly 13 is locked in position by tightening screw clamp 27.

The needle point 21 is then inserted through the sheet material to be cut at the center of the arc or circle until the flat disc 22 presses firmly against the surface of the sheet material. The arc of desired length is cut by means of the razor sharp cutting edge 15.

The flat disc 22 which is rotatably mounted on the support assembly serves to hold the sheet material firmly in place and also protects it from tearing or wrinkling due to the twisting action of the cutting assembly 12. Thus, extremely fragile sheet materials may be cut by means of this radial cutter without danger of damage, since the holding force is distributed over a relatively large area of the sheet. The adjustment screw 31 and the slidable mounting of the cutting assembly 12 permit a rapid yet extremely accurate setting for convenient use in precision operation. Thus the coaction of the protecting disc 22, the adjustment screw 31, the slidable mounting of the cutting assembly plus the extremely sharp edge on the cutting instrument 15 make this radial cutter excellently adapted for use in all delicate and precision radial cutting operations.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. A radial cutter for thin sheet materials comprising a sharp cutting edge and a support assembly adjustably mounted on a bar, said support assembly comprising a sharply pointed pin and a disk near the point of said pin and integrally attached at its center perpendicular to said pin, said disk and pin being adapted to remain in a fixed position while the cutting edge is rotated therearound.

2. A radial cutter for thin sheet materials comprising a sharp cutting edge and a support assembly slidably mounted on an angular bar and projecting at substantially right angles therefrom, said support assembly comprising an open ended shaft slidably mounted on said bar and projecting at substantially right angles therefrom and a sharply pointed pin having a flat disk integrally secured near the point of said pin and substantially perpendicular to said pin, said shaft being rotatably mounted relative to said pin, and a frame rigidly mounted on said bar and operably joined to said support assembly by means of an adjustment screw whereby said pivot assembly may be accurately adjusted on said bar.

3. A device adapted for rotation relative to a workpiece comprising a tool and a body mounted on a support, said support comprising a sharply pointed pin and a plate near the point of said pin and integrally attached remote from its edge and substantially perpendicular to said pin, said body being mounted for rotation relative to said support so that said plate and pin may remain in fixed position relative to a workpiece while the body and tool are rotated thereabout.

JACK I. LONDON.

REFERENCES CITED

The following references are of record in the file of this patent:

UNITED STATES PATENTS

| Number | Name | Date |
|---|---|---|
| 2,355,585 | Halstead | Aug. 8, 1944 |
| 2,383,028 | Twardowski | Aug. 21, 1945 |
| 47,421 | Hubner | Apr. 25, 1865 |
| 2,194,409 | Stangohr | Mar. 19, 1940 |

FOREIGN PATENTS

| Number | Country | Date |
|---|---|---|
| 11,929 | Great Britain | May 25, 1898 |
| 25,175 | Switzerland | Jan. 16, 1902 |